United States Patent
Choi et al.

(10) Patent No.: US 7,086,132 B2
(45) Date of Patent: Aug. 8, 2006

(54) METHOD FOR ASSEMBLING A POLISHING HEAD AND APPARATUS FOR DETECTING AIR LEAKAGE IN THE POLISHING HEAD WHILE ASSEMBLING THE SAME

(75) Inventors: Bong Choi, Suwon-si (KR); Jung-Hwan Sung, Suwon-si (KR); Yong-Seok Ro, Seoul (KR); Doeg-Jung Kim, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 142 days.

(21) Appl. No.: 10/851,221

(22) Filed: May 24, 2004

(65) Prior Publication Data

US 2004/0214513 A1    Oct. 28, 2004

Related U.S. Application Data

(62) Division of application No. 10/259,639, filed on Sep. 30, 2002, now Pat. No. 6,754,942.

(30) Foreign Application Priority Data

Sep. 28, 2001    (KR)    ............................ 2001-60574

(51) Int. Cl.
*B23Q 17/00* (2006.01)
(52) U.S. Cl. .................... 29/407.08; 29/407.1
(58) Field of Classification Search ........... 29/407.08, 29/407.1
See application file for complete search history.

(56) References Cited

U.S. PATENT DOCUMENTS

| 5,584,751 | A | 12/1996 | Kobayashi et al. |
|---|---|---|---|
| 5,803,799 | A | 9/1998 | Volodarsky et al. |
| 6,093,082 | A | 7/2000 | Somekh |
| 6,110,026 | A | 8/2000 | Arai |
| 6,113,480 | A | 9/2000 | Hu et al. |
| 6,210,260 | B1 | 4/2001 | Tanaka et al. |
| 6,272,902 | B1 * | 8/2001 | Chen et al. .................. 451/289 |
| 6,755,723 | B1 * | 6/2004 | Pham .......................... 451/41 |
| 6,966,822 | B1 * | 11/2005 | Kajiwara et al. ............ 451/41 |

* cited by examiner

*Primary Examiner*—David P. Bryant
(74) *Attorney, Agent, or Firm*—Lee & Morse, P.C.

(57) ABSTRACT

Disclosed are a method for assembling a polishing while inspecting for air leakage in the polishing head and an apparatus for performing the same. By the present invention, a polishing head may be tested for air leakage at each assembly step thereof, so that the polishing head may be assembled free of air leakage, thereby reducing testing time of the polishing head, and failure of the polishing head due to air leakage may be prevented. The apparatus includes a housing supporting the polishing head and having coupling lines coupled with ends of tubes provided in the assembled polishing head, or the polishing head being assembled. A pneumatic pressure regulating section selectively supplies positive pressure or vacuum to the tubes through the coupling lines. A sensor section detects the pressure and level of vacuum in the tubes. A determining section determines if there is air leakage in the polishing head.

9 Claims, 7 Drawing Sheets

METHOD FOR ASSEMBLING A POLISHING HEAD AND APPARATUS FOR DETECTING AIR LEAKAGE IN THE POLISHING HEAD WHILE ASSEMBLING THE SAME

CROSS REFERENCE TO RELATED APPLICATION(S)

This is a divisional application based on application Ser. No. 10/259,639, filed Sep. 30, 2002, now U.S. Pat. No. 6,754,942 B2, the entire contents of which is hereby incorporated by reference.

BACKGROUND OF THE INVENTION

1. Field of the Invention

The present invention relates to a method for assembling a polishing head and an apparatus for detecting air leakage in the polishing head while assembling the same. More particularly, the present invention relates to a method for assembling a polishing head while inspecting each tube of the polishing head for air leakage and an apparatus suitable for performing the method.

2. Description of the Related Art

Semiconductor technology is making great strides as information media such as computers are becoming more widely used. In a functional aspect, a semiconductor device is required to be operated at a high speed with a large storage capacity. Accordingly, semiconductor technology is developed to improve the degree of integration, the reliability, and the response speed of semiconductor devices. Therefore, micro-processing techniques are governed by strict requirements in order to improve the degree of integration of semiconductor devices.

Among the micro-processing techniques for improving the degree of integration of semiconductor devices is a planarization technique. In the semiconductor manufacturing industry, chemical mechanical polishing (CMP), in which a wafer is directly polished, is primarily used as a planarization technique.

In order to evenly planarize a wafer using the CMP process, it is important that uniform pressure is applied to each part of the wafer during the CMP process. Accordingly, it is important to provide a proper polishing head, which grips the wafer (holds the wafer by applying suction to the wafer) thereby applying pressure to the wafer during the CMP process.

Specifically, an inner portion of the polishing head has a plurality of tubes used for air passage. A pneumatic pressure or a vacuum is supplied through the tubes. At this time, the wafer below the polishing head is pushed towards a polishing pad by the pneumatic pressure supplied to the polishing head, so that a contact-pressure between the wafer and the polishing pad increases. In addition, the wafer is gripped by suction at a lower portion of the polishing head by the vacuum supplied to the polishing head. However, if there is any air leakage in the tubes of the polishing head, the predetermined pneumatic pressure or the predetermined vacuum cannot be normally supplied to the polishing head. In such a case of air leakage in the tubes, the wafer is unevenly polished due to non-uniform pressure, or the wafer falls from the polishing head due to insufficient suction.

The prior art discloses a polishing device including a polishing head having an air line for controlling the operation of the polishing head and an air control system for controlling the polishing head. The air control system inspects for air leakage in the air line of the polishing head installed in the polishing device. In addition, the prior art discloses a polishing head capable of checking for the existence of a wafer by detecting a pressure variation.

The polishing head has to be periodically disassembled for cleaning or exchanging parts thereof. After being reassembled, the polishing head is installed in the polishing device. If the polishing head is incorrectly assembled, the pneumatic pressure or the vacuum supplied to the polishing head leaks therefrom, so that the polishing head is unable to grip the wafer or the wafer does not receive a precise pressure. Therefore, after assembling the polishing head, testing the polishing head for the existence of air leakage is required. Only if the polishing head does not generate any air leakage can it be used in the CMP process.

The test method is as follows. Firstly, the assembled polishing head is installed in the polishing device. Then, the CMP process, in which a wafer is gripped by the polishing head, is carried out using a dummy wafer. Thereafter, a surface of the polished dummy wafer is inspected to detect scratches and particles formed thereon, thereby determining whether or not the dummy wafer is normally polished. Upon completion of the test, if the dummy wafer is normally polished, a wafer for manufacturing a semiconductor device is introduced into the polishing device equipped with the polishing head, and the CMP process is carried out with respect to the wafer.

If the dummy wafer is abnormally polished, a user separates the polishing head from the polishing device in order to disassemble and re-assemble the polishing head. Then, after re-assembling the polishing head, the leakage test must again be carried out using a dummy wafer to test the polishing head. The leakage test takes about 6 hours. Since about 10% of assembled polishing heads have some air leakage, it is necessary to re-assemble the polishing heads about 10% of the time, resulting in a marked reduction in production from the polishing device. Accordingly, productivity of the semiconductor device manufacturing equipment is also lowered.

SUMMARY OF THE INVENTION

In order to solve the problems mentioned above, it is a first feature of an embodiment of the present invention to provide a method for assembling a polishing head while inspecting the polishing head for air leakage.

A second feature of an embodiment of the present invention is to provide an apparatus for inspecting a polishing head for air leakage during assembly of the polishing head.

To provide the first feature of an embodiment of the present invention, the method for assembling a polishing head while inspecting for air leakage in the polishing head includes assembling an inner tube to a housing and a base, supplying a first pressure through a first pressure line to a first tube connected to the inner tube and inspecting for air leakage by determining if there is any variation in the first pressure in the first tube connected to the inner tube, assembling a membrane to the base once the inner tube is assembled, supplying a second pressure through a second pressure line to a second tube connected to the membrane and inspecting for air leakage by determining if there is any variation in the second pressure in the second tube connected to the membrane, supplying a first level of vacuum through a first vacuum line to the second tube connected to the membrane and inspecting for air leakage by determining if there is any variation in the level of vacuum in the second tube connected to the membrane, assembling a retainer ring to the base once the membrane is assembled, thereby completing an assembling of the polishing head, supplying a third pressure through a third pressure line to a third tube connected to the retainer ring and inspecting for air leakage by determining if there is any variation in the third pressure in the third tube connected to the retainer ring, and supplying a second level of vacuum through a second vacuum line to the third tube connected to the retainer ring and inspecting for air leakage by determining if there is any variation in the second level of vacuum in the third tube connected to the retainer ring.

Preferably, inspecting for air leakage is carried out by supplying a predetermined pressure or level of vacuum to a predetermined tube of the polishing head to be inspected while tubes that are not subject to inspection are closed, closing the predetermined pressure or vacuum line, through which the predetermined pressure or level of vacuum is supplied to the predetermined tube when the pressure or level of vacuum in the predetermined tube reaches the predetermined pressure or level of vacuum, determining if there is any variation in the pressure or level of vacuum in the predetermined tube after a predetermined period of time after closing the predetermined pressure or vacuum line, determining whether air leakage occurs by measuring any variation in the pressure or level of vacuum in the predetermined tube and comparing the variation in the pressure or level of vacuum with a predetermined pressure or level of vacuum. Also, the pressure in the predetermined tube is preferably vented after inspecting for air leakage.

To provide the second feature of an embodiment of the present invention, there is provided an apparatus for inspecting a polishing head for air leakage. The apparatus includes a housing operatively associated with an upper surface of the polishing head for supporting the polishing head, the housing having first, second and third coupling lines, the polishing head having first, second and third tubes, wherein each coupling line of the housing is independently communicated with a corresponding tube of the polishing head, a pneumatic pressure regulating section for selectively supplying a positive pressure or a vacuum to each of the tubes of the polishing head through the coupling lines of the housing, a sensor section for detecting, measuring and generating data relating to a level of positive pressure or vacuum in each of the tubes of the polishing head, and a determining section for receiving data relating to a level of positive pressure or vacuum in each of the tubes of the polishing head from the sensor section to ascertain whether air leakage exists in the polishing head by determining if the level of positive pressure or vacuum in each of the tubes of the polishing head is maintained over a predetermined period of time.

Preferably, the first, second and third tubes provided in the polishing head that are respectively communicated with the first, second and third coupling lines of the housing, are first, second and third air passages, respectively, and are respectively communicated with an inner tube, a membrane and a retainer ring of the polishing head. Also, the first air passage communicated with the inner tube preferably receives only positive pressure from the pneumatic pressure regulating section.

The pneumatic pressure regulating section preferably includes a main pressure regulating device for supplying positive pressure into the first, second and third tubes of the polishing head, a main vacuum regulating device for supplying vacuum into the second and third tubes of the polishing head, a first connection line connected to the main pressure regulating device for transferring positive pressure supplied from the main pressure regulating device, first, second and third pressure lines branched from the first connection line and connected respectively to the first, second and third coupling lines of the housing, each of the first, second and third pressure lines having a first valve for selectively opening and closing the first, second and third pressure lines, a second connection line connected to the main vacuum regulating device for transferring vacuum supplied from the main vacuum regulating device, first and second vacuum lines branched from the second connection line and connected respectively to the second and third coupling lines of the housing, each of the first and second vacuum lines having a second valve for selectively opening and closing the first and second vacuum lines, and a third connection line connected to the second coupling line of the housing, and connecting the second pressure line to the first vacuum line so that the second pressure line and the first vacuum line are connected to the second coupling line of the housing, and a fourth connection line connected to the third coupling line of the housing, and connecting the third pressure line to the second vacuum line so that the third pressure line and the second vacuum line are connected to the third coupling line of the housing.

Preferably, the first pressure line is directly connected to the first coupling line of the housing communicated with the inner tube of the housing.

The apparatus may further include a venting valve connected to each of the first valves and the first, second and third pressure lines to allow or prevent discharge of pressure from each of the tubes of the polishing head to an exterior.

Preferably, the sensor section includes first sensors provided on each of the first valves and the first, second and third pressure lines connected to the first, second and third coupling lines of the housing to detect pressure in the first, second and third tubes of the polishing head, and second sensors provided on each of the second valves and the first and second vacuum lines connected to the second and third coupling lines of the housing to detect a level of vacuum in the second and third tubes of the polishing head. Preferably, a timer is attached to each of the sensors of the sensor section for notifying of a lapse of time.

The apparatus may further include first control sections connected to the first sensors and the first valves for driving the first valves based on the data obtained from the first sensors in order to individually control pressure supplied to the first, second and third tubes of the polishing head, and second control sections connected to the second sensors and the second valves for driving the second valves based on the data obtained from the second sensors in order to individually control the vacuum supplied into the second and third tubes of the polishing head.

The apparatus may further include a driving section having a rail and coupled to a predetermined side portion of the housing for moving the housing and the polishing head supported by the housing in upward and downward directions along the rail, a motor connected to the housing for driving the housing along the rail, and a measuring section for measuring a driving distance of the housing.

There is preferably a seat sensor provided opposite to a bottom of the polishing head supported by the housing for detecting the pressure at each part of the bottom of the polishing head by making contact with the bottom of the polishing head, and a display section for displaying the pressure detected from each part of the seat sensor.

By using the assembling method and apparatus for a polishing head of the present invention, air leakage may be detected during assembly of the polishing head, unlike in the prior art, in which testing for air leakage is not performed until the polishing head is fully assembled and installed. If air leakage is detected during the process of assembling the polishing head in the present invention, the assembly step immediately prior to the detection of air leakage is repeated, and the leakage test is repeated, so that the polishing head may be assembled without any air leakage. Accordingly, by using the present invention, a lengthy test of the completely assembled and installed polishing head is unnecessary. In the prior art, if the polishing head is abnormally assembled and a leak is detected, all parts of the polishing head must be disassembled and re-assembled in order to stop the leak, a process that is eliminated by the present invention. Furthermore, when using the present invention, after assembling the polishing head, the polishing head may be installed in a polishing device and immediately used to polish a wafer, without having to be tested on a dummy wafer first, thereby improving the productivity of the semiconductor device manufacturing equipment.

BRIEF DESCRIPTION OF THE DRAWINGS

The above features and other advantages of the present invention will become more apparent by describing in detail preferred embodiments thereof with reference to the attached drawings in which.

DETAILED DESCRIPTION OF THE PREFERRED EMBODIMENTS

Korean Patent Application Number 2001-60574, filed on Sep. 28, 2001, and entitled: "Method for Assembling a Polishing Head and Apparatus for Inspecting an Air Leakage in the Polishing Head While Assembling the Same," is incorporated by reference herein in its entirety.

Hereinafter, preferred embodiments of the present invention will be described in detail with reference to the accompanying drawings.

Figure 1:
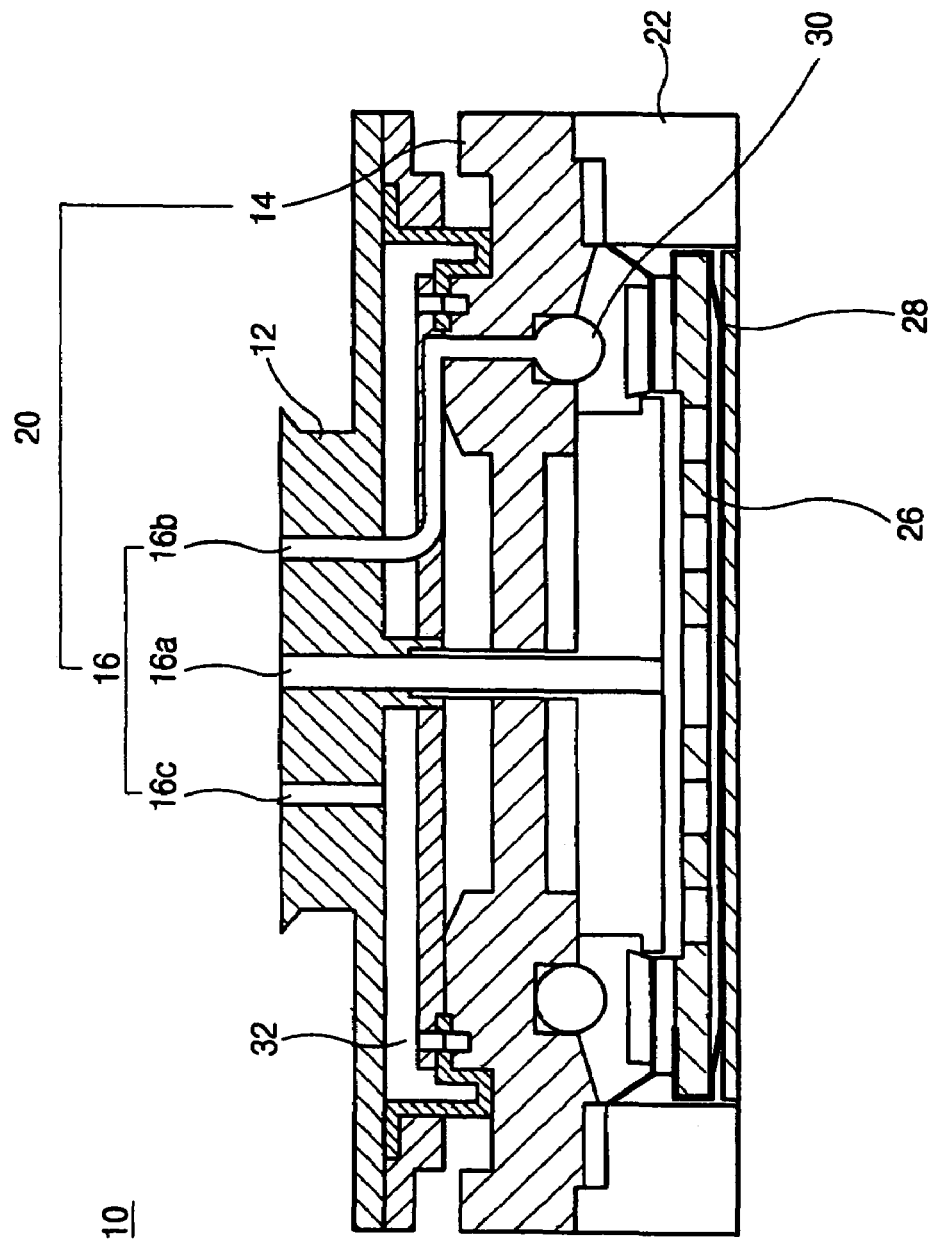
FIG. 1 depicts a sectional view of a polishing head equipped in a polishing device.

FIG. 1 depicts a sectional view of a polishing head equipped in a polishing device.

Referring to FIG. 1, a polishing head 10 includes a body 20 capable of rotating and moving up and down. The body 20 includes a housing 12 and a base 14 for supporting the housing 12. The housing 12 has upper and lower surfaces having a circular shape, and a first tube 16a passing through a center of the housing 12 from the upper surface to the lower surface of the housing 12. In addition, second and third tubes 16b and 16c passing through the housing 12 from the upper surface to the lower surface of the housing 12 are spaced apart radially outward by a predetermined distance from the first tube 16a. The first to third tubes 16a, 16b and 16c act as air passages 16.

A retainer ring 22 is provided at a lower peripheral portion of the base 14 of the body 20 to prevent a wafer from drifting laterally. In addition, a perforated plate 26 is installed in the retainer ring 22 at a lower portion of the body 20 to distribute pressurized air to be supplied. A membrane 28 having a predetermined elasticity is provided to fully cover a lower surface of the perforated plate 26. A rear surface of the wafer being polished makes contact with a lower surface of the membrane 28. Specifically, the membrane 28 expands and shrinks due to the pressurized air or vacuum supplied through the first tube 16a, which applies pressure or suction to the wafer.

The second tube 16b is connected to the inner tube 30, which is continuously formed at a periphery of the perforated plate 26. Pneumatic pressure supplied through the second tube 16b causes the inner tube 30 to expand. Accordingly, an upper surface of the periphery of the perforated plate 26 is pushed by the pressure, which is created by the expansion of the second tube 16b, so that the pressure is applied to a predetermined portion of the wafer to be polished.

The third tube 16c is communicated with a first chamber 32 defined between the housing 12 and the base 14. The pressurized air or vacuum is supplied into the first chamber 32 through third tube 16c, so that pressure or suction is applied to the retainer ring 22 provided at a lower portion of the base 14.

Figure 2:
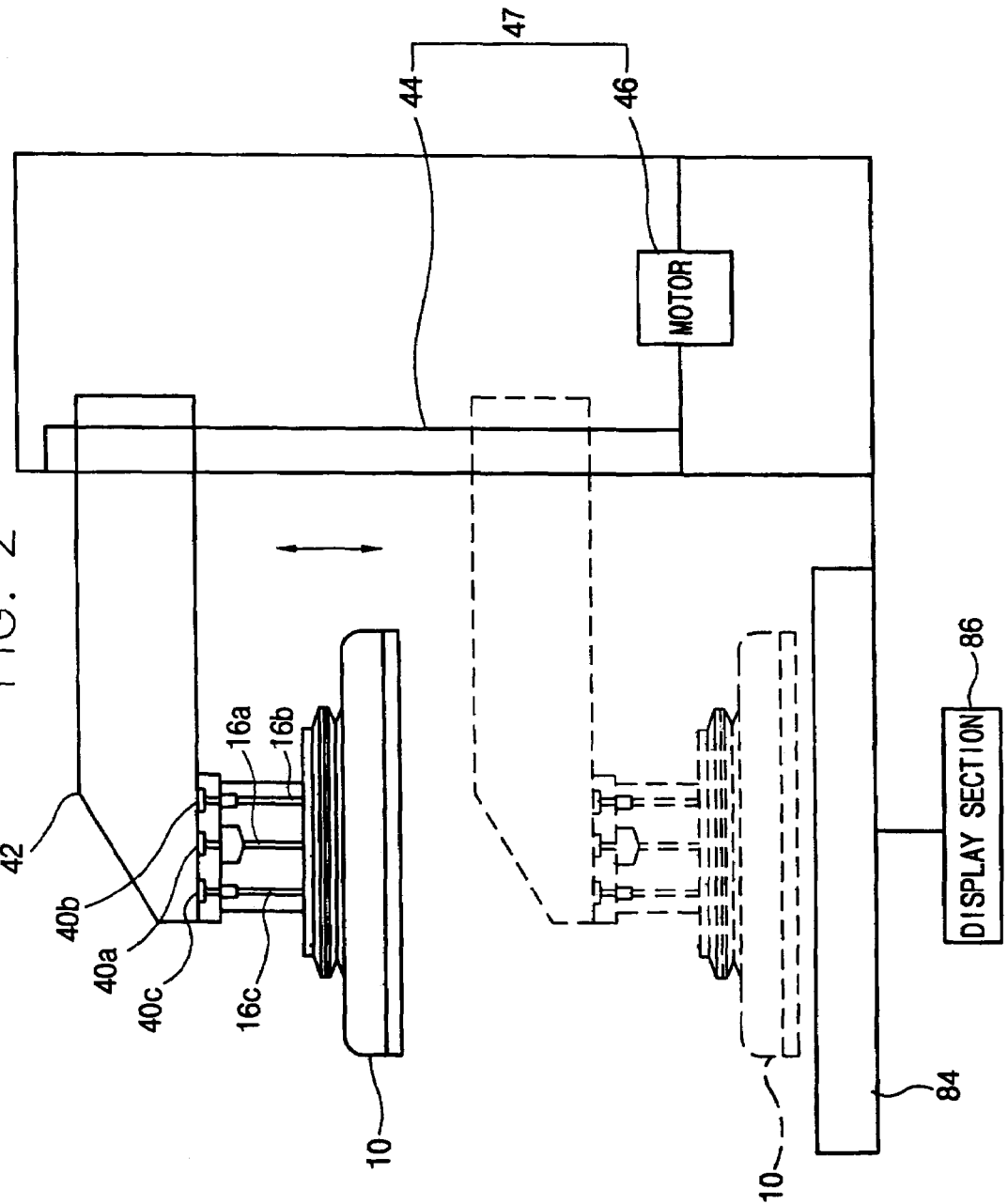
FIGS. 2 and 3 depict front and side views of an apparatus for inspecting a polishing head according to one embodiment of the present invention.
Figure 3:
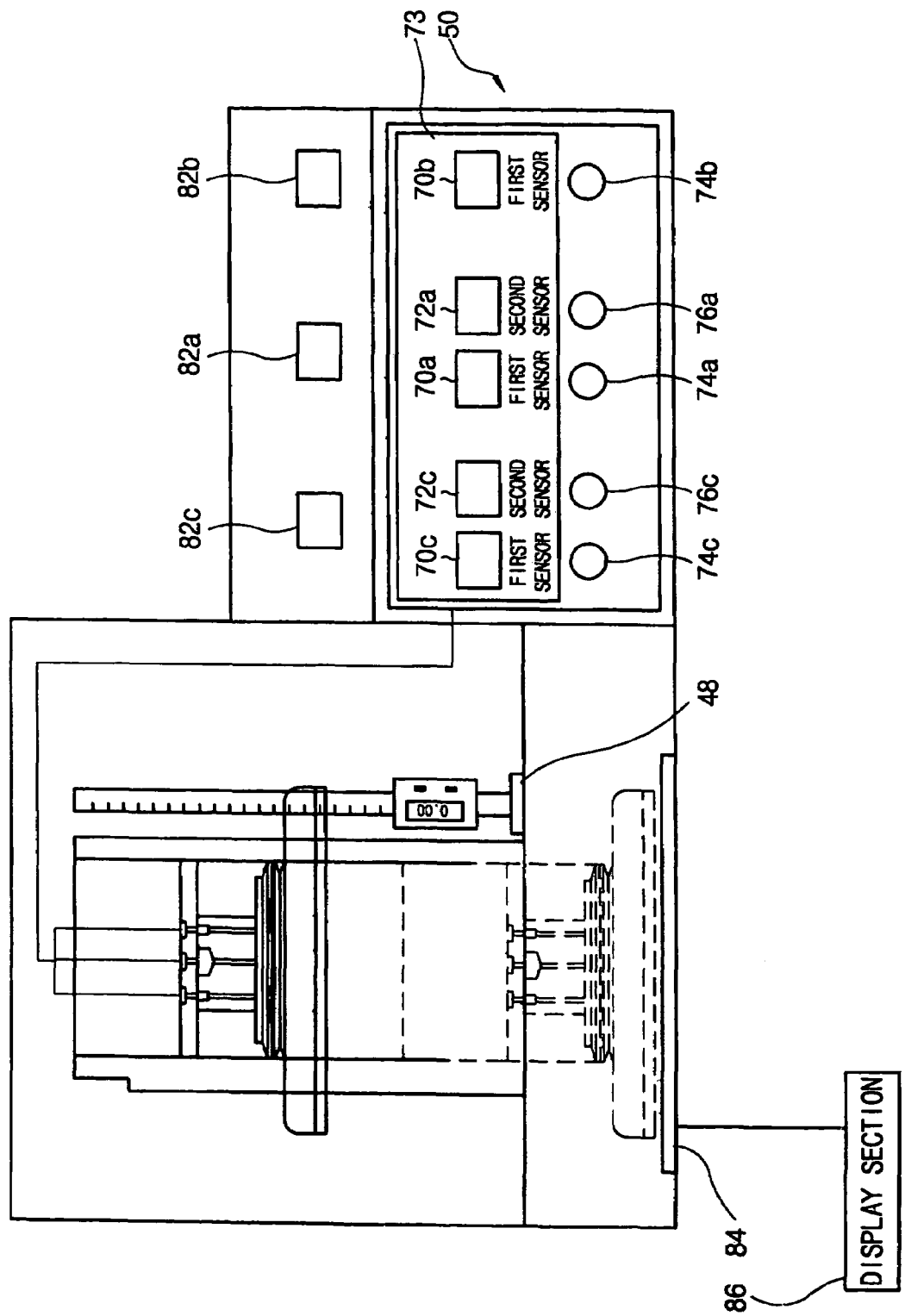

FIGS. 2 and 3 illustrate front and side views of an apparatus for inspecting the polishing head according to an embodiment of the present invention.

Referring to FIGS. 1, 2 and 3, the apparatus includes a housing 42 operatively associated with an upper surface of the polishing head 10 to support the polishing head 10. The housing 42 has first, second and third coupling lines 40b, 40a and 40c that are separately coupled to ends of first, second and third tubes 16b, 16a and 16c provided in both the assembled polishing head and the polishing head being assembled. The coupling lines 40a, 40b and 40c of the housing 42 respectively supply the positive pressure or level of vacuum to the tubes 16a, 16b and 16c of the polishing head 10. In addition, the coupling lines 40a, 40b and 40c of the housing 42 are respectively coupled to the tubes 16a, 16b and 16c of the polishing head 10 by a clamp (not shown) so as to prevent a leakage therebetween.

In detail, the tubes 16a, 16b and 16c provided in the polishing head 10 act as air passages respectively communicated with the membrane 28, the inner tube 30 and the retainer 22 included in the polishing head 10. The membrane 28, the inner tube 30 and the retainer 22 included in the polishing head 10 receive the pneumatic pressure through the tubes 16a, 16b and 16c respectively communicated therewith while the polishing process is carried out, thereby gripping (holding the wafer by suction) or uniformly polishing the wafer. When the polishing process is carried out, only pressure is supplied to the tube communicated with the inner tube 30. Accordingly, the inner tube 30 is expanded due to the pressure and pushes the predetermined portion of the wafer positioned below the polishing head 10, so that the wafer is uniformly polished. On the contrary, pressure or vacuum is selectively supplied to the retainer ring 22, which prevents the wafer from drifting in a lateral direction, and the membrane 28, which grips the wafer or applies pressure to the wafer.

The coupling lines 40a, 40b and 40c provided in the housing 42 may be respectively coupled to the tubes 16a, 16b and 16c communicated with the membrane 28, the inner tube 30 and the retainer ring 22 in a state that the polishing head 10 is completely assembled. In a specific case, at least one of the tubes 16a, 16b and 16c communicated with the membrane 28, the inner tube 30 and the retainer ring 22 is selected to be coupled with the respective coupling lines 40a, 40b and 40c while the polishing head is being assembled. By coupling the tubes of the polishing head 10 to the coupling lines of the housing 42, the upper surface of the polishing head may be supported by the housing 42.

A driving section 47 has a rail 44 and is coupled to a predetermined side portion of the housing 42 for moving the housing 42 and the polishing head 10 supported by the housing 42 in upward and downward directions along the rail. In addition, a motor 46 is connected to the housing 42 for supplying a driving force for driving the housing 42 in the upward or downward direction along the rail 44. A measuring section 48 is provided to measure the driving distance of the housing 42 moving along the rail 44. When the housing 42 is driven by the driving section 47, the polishing head 10 supported by the housing 42 is simultaneously driven in the upward or downward direction. Therefore, when the coupling lines 40a, 40b and 40c provided in the housing 42 are coupled with tubes 16a, 16b and 16c of the polishing head 10, the user may place the housing 42 in a proper working position. In addition, it is also possible to test for air leakage in the polishing head 10 by setting a distance between the polishing head 10 coupled to the housing 42 and a predetermined portion opposite to the polishing head 10 to be identical to a distance between the polishing pad and the polishing head 10 in the polishing process.

A pneumatic pressure regulator 50 (refer to FIG. 4) is provided to supply the pressure or vacuum into tubes 16a, 16b and 16c of the polishing head 10 coupled with the housing 42. The pneumatic pressure regulator 50 individually supplies the required pressure to the tubes 16a, 16b and 16c of the polishing head 10 through the coupling lines 40a, 40b and 40c and the vacuum to the tubes 16a and 16c of the polishing head 10 through the coupling lines 40a and 40c.

Figure 4:
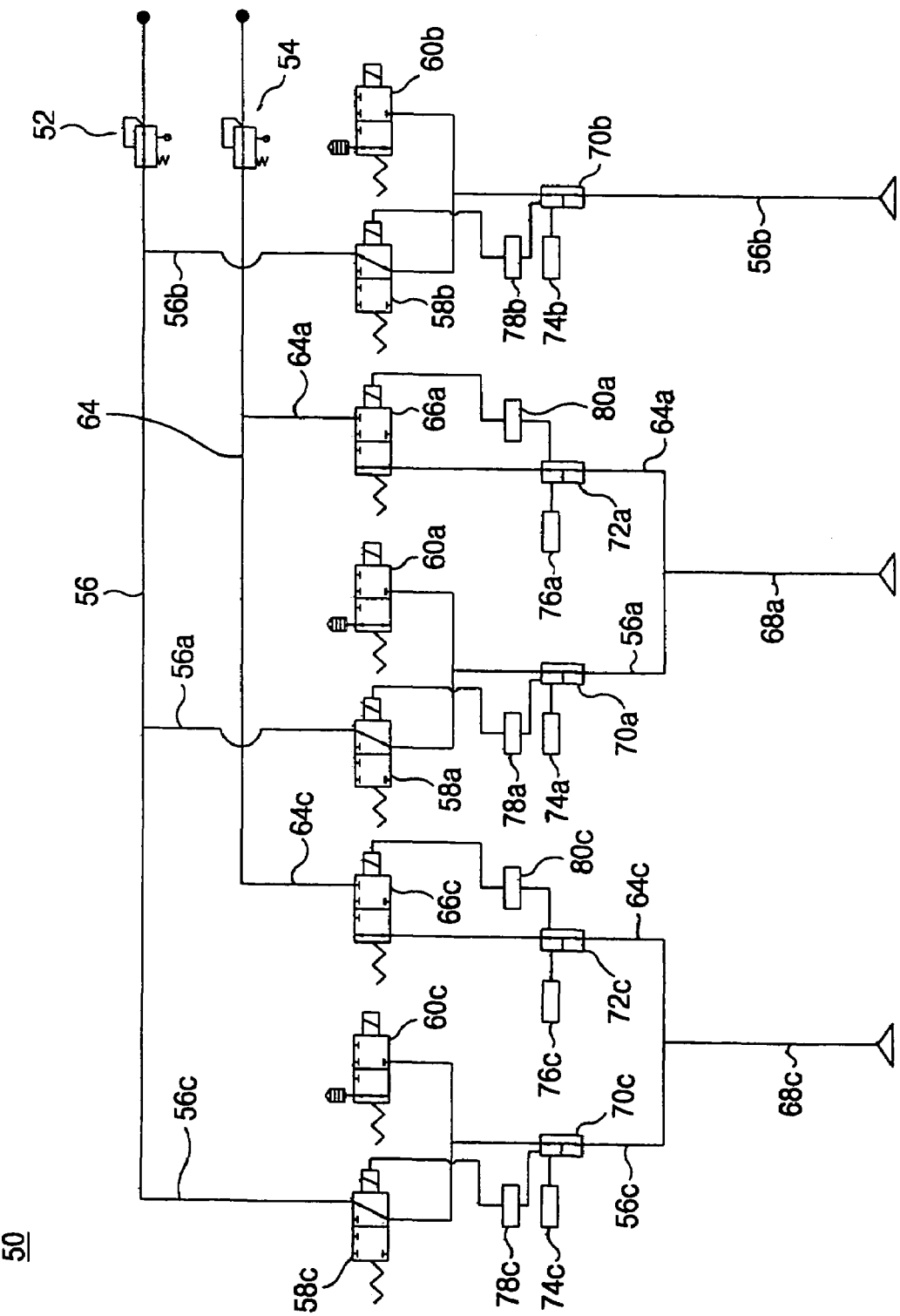
FIG. 4 depicts a view of a pneumatic pressure regulating section used in the inspecting apparatus according to one embodiment of the present invention.

FIG. 4 shows an example of a pneumatic pressure regulating section used in the inspecting apparatus when assembling the polishing head according to an embodiment of the present invention.

Referring to FIGS. 2 and 4, a main pressure regulator 52 is provided to supply the pressure into each of the tubes 16a, 16b and 16c of the polishing head 10. In addition, a main vacuum regulator 54 is provided to supply the vacuum into the tubes 16a and 16c of the polishing head 10.

A first connection line 56 is connected to the main pressure regulator 52 in order to transfer the positive pressure supplied from the main pressure regulator 52. In addition, a plurality of pressure lines 56a, 56b and 56c are branched from the first connection line 56 towards the coupling lines 40a, 40b and 40c of the housing 42. Accordingly, the positive pressure supplied from the main pressure regulator 52 is transferred into the pressure lines 56a, 56b and 56c through the first connection line 56.

First valves 58a, 58b and 58c are provided on the pressure lines 56a, 56b and 56c. Each of the first valves 58a, 58b and 58c is able to control the opening and closing of the pressure lines 56a, 56b and 56c. Accordingly, the positive pressure and vacuum may be selectively supplied to the coupling lines 40a, 40b and 40c of the housing.

Particularly, the first connection line 56 is preferably branched into the coupling lines 40a, 40b and 40c of the housing 42 communicated with the membrane 28, the inner tube 30 and the retainer ring 22 of the polishing head 10. Therefore, the three pressure lines 56a, 56b and 56c are provided on the first connection line 56. In addition, each of the first valves 58a, 58b and 58c is provided on each of the pressure lines 56a, 56b and 56c. At this time, each of the three first valves 58a, 58b and 58c may be independently controlled, making it possible to shut off the positive pressure or selectively supply the predetermined positive pressure independently to each of the tubes 16a, 16b and 16c of the polishing head 10 respectively connected to the membrane 28, the inner tube 30 and the retainer ring 22. Venting valves 60a, 60b and 60c are connected in a row to the first valves 58a, 58b and 58c provided on the pressure lines 56a, 56b and 56c. The venting valves 60a, 60b and 60c allow the positive pressure supplied into each of the tubes 16a, 16b and 16c of the polishing head 10 through the pressure lines 56a, 56b and 56c to be discharged to the exterior. That is, by opening the venting valves 60a, 60b and 60c while shutting off the first valves 58a, 58b and 58c, the pressure in each of the tubes 16a, 16b and 16c of the polishing head 10 may be discharged to the exterior through the venting valves 60a, 60b and 60c. The venting valves 60a, 60b and 60c are provided in order to discharge the pressure from the tubes 16a, 16b and 16c when the pressure is no longer supplied into the tubes 16a, 16b and 16c. While the pressure is being supplied into the tubes 16a, 16b and 16c, the venting valves 60a, 60b and 60c are closed.

A second connection line 64 is connected to the main vacuum regulator 54 in order to allow transfer of the vacuum supplied by the main vacuum regulator 54. Also, a plurality of vacuum lines 64a and 64c are branched from the second connection line 64 and respectively coupled to coupling lines 40a and 40c of the housing 42. Accordingly, vacuum supplied from the main vacuum regulator 54 may be transferred to vacuum lines 64a and 64c through the second connection line 64.

Second valves 66a and 66c are provided on the vacuum lines 64a and 64c, respectively, to allow the vacuum lines 64a and 64c to be opened or closed. Therefore, the vacuum supplied through the vacuum lines 64a and 64c may be selectively supplied to the coupling lines 40a and 40c of the housing 42.

The vacuum lines 64a and 64c preferably are not branched into the coupling line 40b of the housing communicated with the inner tube 30 of the polishing head 10. The reason for this is that only pressure is supplied into the inner tube 30 of the polishing head 10 when the polishing process is carried out, and vacuum lines 64a and 64c are used to supply vacuum.

Particularly, the vacuum lines 64a and 64c are branched into the coupling lines 40a and 40c of the housing 42, which are communicated with the membrane 28 and the retainer ring 22 of the polishing head 10. Because the two second valves 66a and 66c may be individually controlled, it is possible to selectively supply the vacuum to the tubes 16a and 16c of the polishing head 10, which are connected to the membrane 28 and the retainer ring 22.

In addition, a third connection line 68a allows pressure line 56a and vacuum line 64a to be connected together in a row, and to be connected to coupling line 40a of the housing 42 communicated with the membrane 28. A fourth connection line 68c allows pressure line 56c and vacuum line 64c to be connected together in a row, and to be connected to coupling line 40c of the housing 42 communicated with the retainer ring 22. The third and fourth connection lines are necessary because both vacuum and pressure are selectively supplied to the coupling lines 40a and 40c.

Since the coupling line communicated with the inner tube 30 is not connected to the vacuum lines 64a and 64c, another connection line is not required thereto. Therefore, the pressure line 56b provided to supply the pressure to the inner tube 30 is directly connected to the coupling line 40b of the housing 42 communicated with the inner tube 30.

Accordingly, the pneumatic pressure regulator 50 shown in FIG. 4 is capable of supplying the predetermined positive pressure into each of the tubes 16a, 16b and 16c of the polishing head 10, and the predetermined level of vacuum to both the tubes 16a and 16c of the polishing head 10.

Hereinafter, the apparatus for inspecting the polishing head for leakage while assembling the polishing head will be further described with respect to FIGS. 2, 3 and 4.

A sensor section 73 detects the pressure or level of vacuum in each of the tubes 16a, 16b and 16c of the polishing head 10. Sensors 70a, 70b, 70c, included in the sensor section 73 are respectively provided on the pressure lines 56a, 56b and 56c, and sensors 72a and 72c included in the sensor section 73 are respectively provided on the pressure lines 64a, and 64c for supplying the pressure or level of vacuum into each of the tubes 16a, 16b and 16c. In addition, timers 74a, 74b, 74c, 76a and 76c are provided in each sensor to notify the user of a lapse of time.

The positions of each sensor 70a, 70b, 70c, 72a and 72c in the pneumatic pressure regulator 50 will now be described. The sensors 70a, 70b and 70c are respectively provided in the pressure lines 56a, 56b and 56c supplying the pressure into each of the tubes 16a, 16b and 16c, and the sensors 72a and 72c are respectively provided in the vacuum lines 64a and 64c supplying the level of vacuum into each of the tubes 16a and 16c. At this time, sensors 70a, 70b, 70c, 72a and 72c are respectively positioned at rear ends of valves 58a, 58b, 58c, 66a and 66c respectively provided on the pressure and vacuum lines 56a, 56b, 56c, 64a and 64b.

Specifically, first sensors 70a, 70b and 70c are respectively provided in the pressure lines 56a, 56b and 56c which connect the first valves 58a, 58b and 58c to coupling lines 40a, 40b and 40c of the housing 42. Accordingly, the first sensors 70a, 70b and 70c are able to detect the positive pressure in each of the tubes 16a, 16b and 16c, which is varied depending on the operating state of the first valves 58a, 58b and 58c. First control sections 78a, 78b and 78c are respectively connected to the first sensors 70a, 70b and 70c and the first valves 58a, 58b and 58c in order to drive the first valves 58a, 58b and 58c based on data obtained from the first sensors 70a, 70b and 70c. The first control sections 78a, 78b and 78c shut off the first valves 58a, 58b and 58c when the pressure in each of the tubes 16a, 16b and 16c maintains a predetermined pressure, thereby individually controlling the positive pressure supplied to each of the tubes 16a, 16b and 16c.

In addition, second sensors 72a and 72c for detecting the level of vacuum are respectively provided in the vacuum lines 64a and 64c which connect the second valves 66a and 66c to coupling lines 40a and 40c of the housing 42. Accordingly, the second sensors 72a and 72c are able to detect the level of vacuum in the tubes 16a and 16c, which is varied depending on the control state of the second valves 66a and 66c. At this time, it is possible to provide second control sections 80a and 80c connected to the second sensors 72a and 72c and the second valves 66a and 66c to drive the second valves 66a and 66c based on data detected by the sensors 72a and 72c. The second control sections 80a and 80c shut off the second valves 66a and 66c when the level of vacuum in each of the tubes 16a and 16c maintains a predetermined value, thereby individually controlling the level of vacuum supplied to the tubes 16a and 16c.

In addition, determining sections 82a, 82b and 82c are provided for determining the air leakage in the polishing head 10. The determining sections 82a, 82b and 82c receive data relating to a level of positive pressure or vacuum in each of the tubes 16a, 16b and 16c from sensors 70a, 70b, 70c, 72a and 72c of the sensor section 73 to ascertain whether air leakage exists in the polishing head by determining if the positive pressure or the level of vacuum in each of the tubes is maintained over a predetermined period of time.

Specifically, in order to inspect each of the tubes 16a, 16b and 16c of the polishing head 10 for air leakage, the predetermined level of positive pressure or vacuum is supplied to each of the tubes 16a, 16b and 16c. Then, the valves 58a, 58b, 58c, 66a and 66c respectively connected to the tubes are closed. At this time, the determining sections 82a, 82b and 82c continuously receive the data relating to a level of positive pressure or vacuum and ascertain whether or not the level of positive pressure or vacuum in each of the tubes is in a range of predetermined values after a predetermined period of time in order to determine whether air leakage exists in each of the tubes. After closing the valves 58a, 58b, 58c, 66a and 66c, timers 74a, 74b, 74c, 76a and 76c provided in the sensors 70a, 70b, 70c, 72a and 72c are operated to notify the user of the lapse of time.

A seat sensor 84, for detecting the level of positive pressure in each part of the bottom of the polishing head 10, is positioned opposite to a bottom of the polishing head 10. The seat sensor 84 is able to detect the pressure at each part of an upper surface thereof. A display section 86 is connected to the seat sensor 84 for displaying the pressure value detected from each part of the seat sensor 84.

Accordingly, the contact pressure between the bottom of the polishing head 10 and the upper surface of the seat sensor 84 may be obtained after supplying the pneumatic pressure into the membrane 28, the inner tube 30 and the retainer ring 22 of the assembled polishing head 10. The contact pressure allows the user to recognize whether or not the pressure is evenly applied to the entire surface of the wafer by the polishing head 10. At this time, a distance between the polishing head 10 and the seat sensor 84 is identical to a distance between the polishing pad and the polishing head 10 in the polishing process. In addition, it is possible to obtain the optimum condition for polishing the entire surface of the wafer by monitoring the pressure applied to the seat sensor while controlling the positive pressure applied to each of the tubes 16a, 16b and 16c.

Hereinafter, a method for assembling the polishing head while inspecting the polishing head for air leakage by means of the above-mentioned leakage inspecting apparatus will be described, with reference to FIGS. 5A and 5B. Also, reference numerals in the following description refer to those of FIGS. 1–4.

Figure 5A:
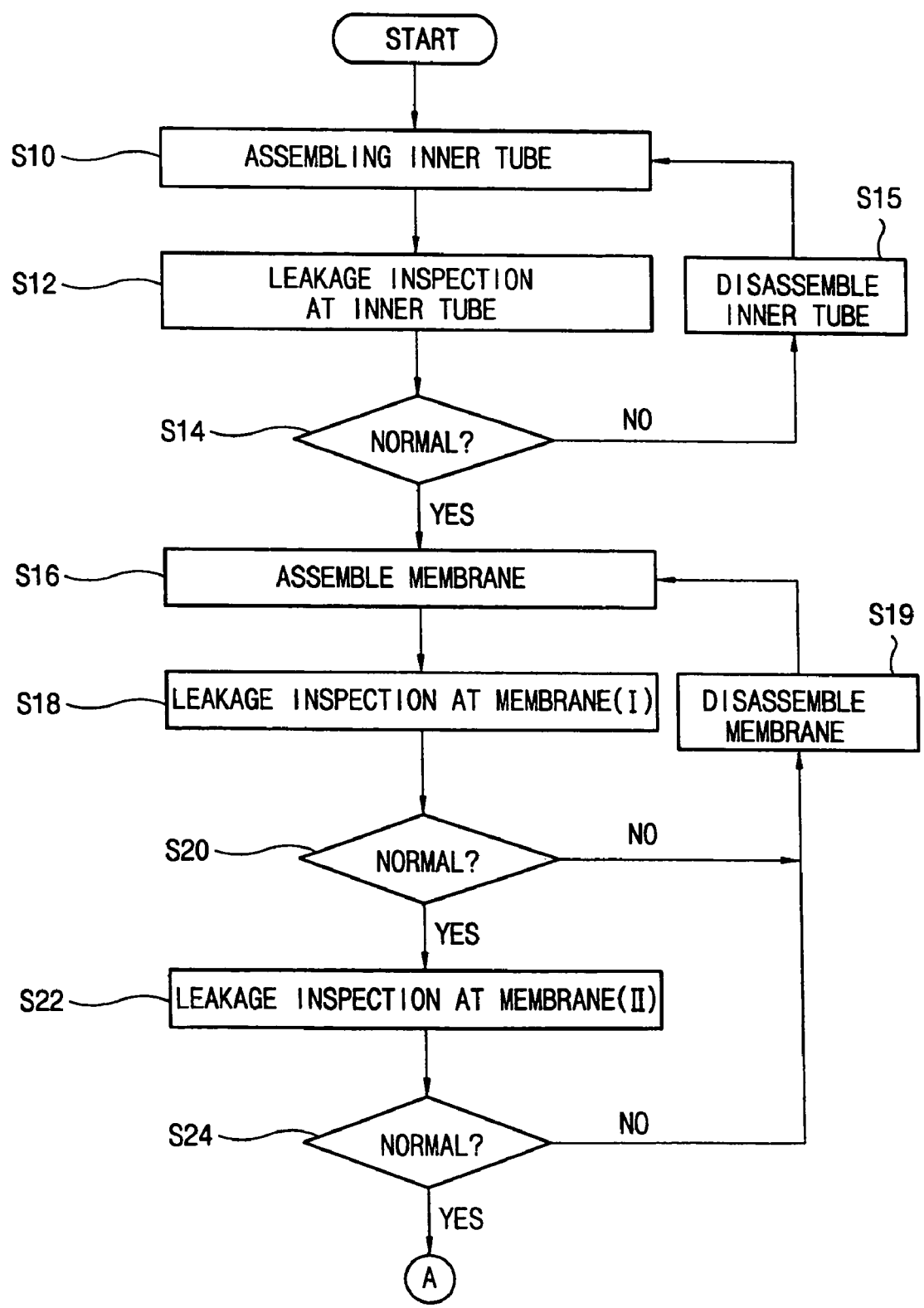
FIGS. 5A and 5B depict a flow chart illustrating a method for inspecting each tube of the polishing head into which the pneumatic pressure is supplied for air leakage, during assembly of the polishing head and after the polishing head has been assembled.
Figure 5B:
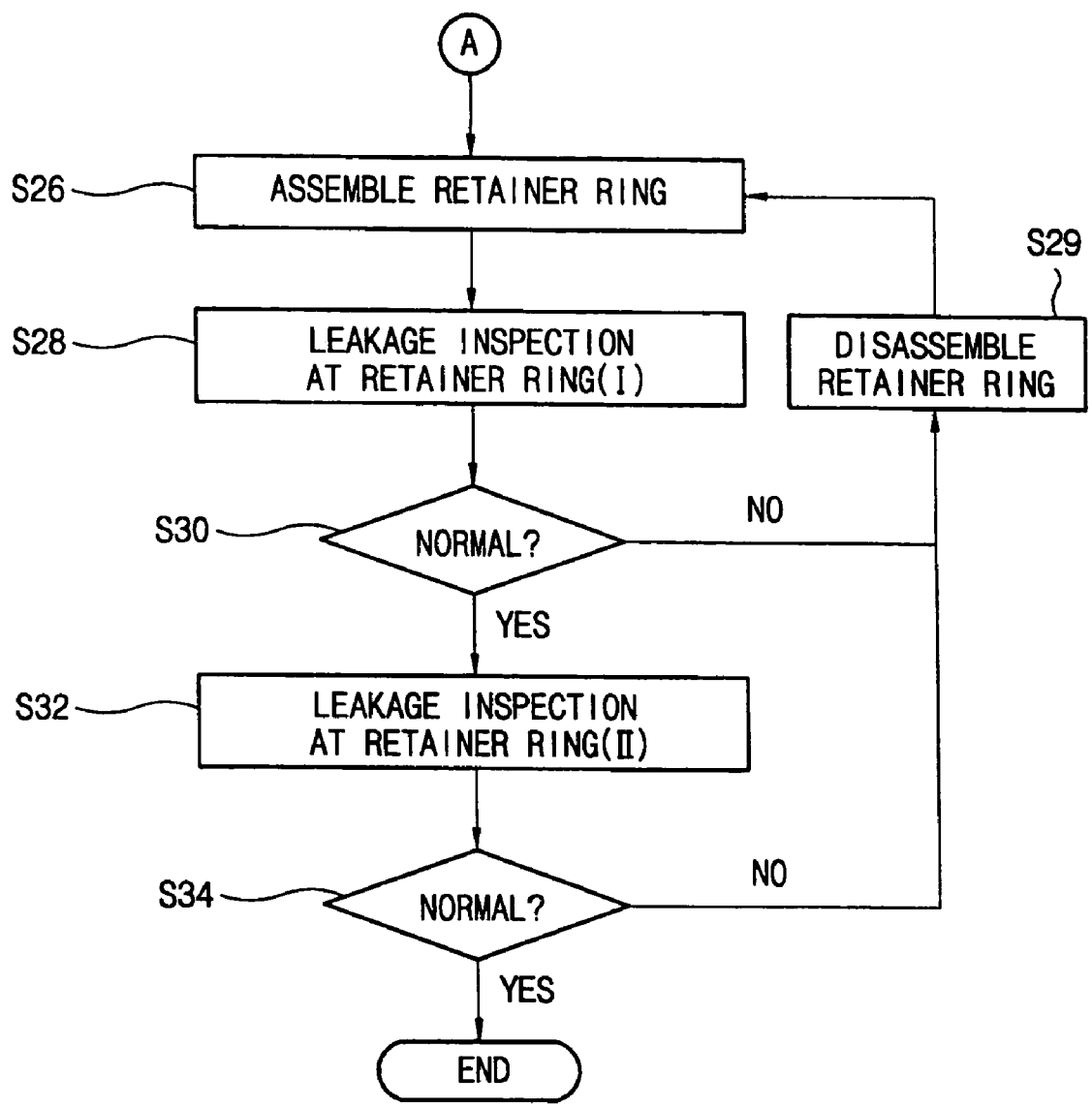

FIGS. 5A and 5B depict a flow chart illustrating a method for assembling the polishing head according to an embodiment of the present invention.

The inner tube 30 is assembled to the housing 12 and the base 14. A worker manually carries out the assembly work (step S10).

Then, a predetermined positive pressure is supplied to the tube 16b connected to the inner tube 30. After that, the pressure line 56b supplying the positive pressure to the tube 16b is shut-off and the pressure in the tube 16b is measured in order to inspect for air leakage in the inner tube 30 (step S12).

Specifically, an end of the tube 16b connected to the inner tube 30 is coupled with the coupling line 40b of the housing 42 by means of a clamp. Then, the predetermined positive pressure is supplied to the inner tube 30 through the pressure lines 56a and 56c connected to the main pressure regulator

52. At this time, the positive pressure supplied from the main pressure regulator 52 is not transferred to the membrane 28 and the retainer ring 22. That is, the first valve 58*b* provided in the pressure line 56*b* communicated with the inner tube 30 is opened, and the first valves 58*a* and 58*c* provided in the pressure lines 56*a* and 56*c*, respectively, are closed, such that the positive pressure is supplied only to the inner tube 30. When the pressure in the inner tube 30 reaches the predetermined pressure, the first control section 78*b* formed in the pressure line 56*b* communicated with the inner tube 30 closes the first valve 58*b* such that the positive pressure is no longer supplied into the inner tube 30. Then, after the predetermined period of time, the pressure in the inner tube 30 is measured to detect whether or not the inner tube 30 maintains the predetermined pressure, thereby determining whether or not any air leakage exists in the inner tube 30. If the pressure in the inner tube 30 is within a predetermined range, it is determined that air leakage does not exist in the inner tube 30. However, if the pressure in the inner tube 30 is below the predetermined range, it is determined that air leakage does exist in the inner tube 30.

When air leakage is detected at the inner tube 30 through the above inspection (step S14), the inner tube 30 is disassembled (step S15) in order to be re-assembled (step S10). The leakage inspection test (step S12) described above is then repeated on the re-assembled inner tube 30.

When the leakage inspection at the inner tube 30 is completed, the positive pressure supplied to the inner tube 30 is vented by opening venting valve 60*b* connected in a row to first valve 58*b* provided in pressure line 56*b*.

Then, the membrane 28 is assembled to the base 14 once the inner tube 30 has been assembled (step S16).

A predetermined positive pressure is supplied into the tube 16*a* connected to the membrane 28. Then, the pressure line 56*a* supplying the positive pressure to the tube 16*a* is shut-off, and the pressure in the tube 16*a* is measured in order to inspect for air leakage in the membrane 28 (step S18).

The method for inspecting for air leakage in the membrane 28 is substantially identical to the method for inspecting for air leakage in the inner tube 30, except that the positive pressure is supplied to the tube 16*a* communicated with the membrane 28, instead of the tube 16*b* communicated with the inner tube 30, so the detailed description thereof will be omitted. At this time, the predetermined positive pressure is supplied only to the tube connected to the membrane 28, and the tube communicated with the inner tube 30 is closed.

If air leakage is detected in the membrane 28 through the above inspection (step S20), the membrane 28 is disassembled (step S19) in order to be re-assembled (step S16). The leakage inspection test (I) (step S18) described above is then repeated on the re-assembled membrane 28.

When the leakage inspection in the membrane (I) performed by supplying the pressure is completed, the pressure in the membrane 28 is vented to the exterior by opening venting valve 60*a* connected, in a row, to first valve 58*a* provided in first branch line 56*a*.

Then, the vacuum is supplied to the membrane 28 in order to perform leakage inspection in the membrane 28 (I I) (step S22).

Specifically, a predetermined level of vacuum is supplied to the tube 16*a* connected to the membrane 28 through vacuum lines 64 and 64*a* connected to the main vacuum regulator 54. At this time, the second valve 66*c* in the vacuum line 64*c* communicated with the retainer ring 22 is closed, so that the vacuum is supplied only to the membrane 28. When the predetermined level of vacuum is reached in the membrane 28, second control section 80*a* provided in vacuum line 64*a* communicated with the membrane 28 closes the second valve 66*a*, so that the vacuum is no longer supplied to the membrane 28. Then, after the predetermined period of time, the level of vacuum in the membrane 28 is measured to detect whether or not the membrane 28 maintains the predetermined level of vacuum, thereby determining whether or not any air leakage exists in the membrane 28. If the level of vacuum in the membrane 28 is within a predetermined range, it is determined that air leakage does not exist in the membrane 28. However, if the level of vacuum in the membrane 28 is below the predetermined range, it is determined that air leakage does exist in the membrane 28.

When air leakage is detected in the membrane 28 through the above inspection (step S24), the membrane 28 is disassembled (step S19) in order to be re-assembled (step S16). The leakage inspection test (I) and leakage inspection test (I I) (steps S18, S20 and S22) described above are then repeated on the re-assembled membrane 28.

Then, the retainer ring 22 is assembled to the base 14 once the membrane 28 is assembled, thereby completing the assembling work of the polishing head 10 (step S26).

Thereafter, a predetermined positive pressure is supplied to the tube 16*c* connected to the retainer ring 22. Then, the pressure 56*c* supplying the positive pressure to the retainer ring 22 is shut-off and the pressure in the tube is measured in order to inspect for air leakage at the retainer ring 22 (step S28). The method for inspecting for air leakage at the retainer ring 22 is substantially identical to the methods for inspecting for air leakage in the inner tube 30 and the membrane 28, except for the tube receiving the positive pressure, so detailed description thereof will be omitted. The positive pressure is supplied only to the tube communicated with the retainer ring 22, and tubes communicated with the inner tube 30 and the membrane 29 are shut-off.

When air leakage is detected at the retainer ring 22 through the above inspection (step S30), the retainer ring 22 is disassembled (step S29) in order to be re-assembled (step S26). The leakage inspection test (I) (step S28) described above is then repeated on the re-assembled membrane 28.

When the leakage inspection at the retainer ring (I) performed by supplying the pressure is completed, the pressure in the retainer ring 22 is vented to the exterior by opening venting valve 60*c* connected, in a row, to first valve 58*c* provided in pressure line 56*c*.

Then, the vacuum is supplied to the retainer ring 22 in order to perform leakage inspection at the retainer ring 22 (I I) (step S32).

If air leakage is detected at the retainer ring 22 through the above inspection (step S34), the retainer ring 22 is disassembled (step S29) in order to be re-assembled (step S26). The leakage inspection test (I) and leakage inspection test (I I) (steps S28, S30 and S32) described above are then repeated on the re-assembled retainer ring 22.

As described above, the polishing head is tested for air leakage at each assembling step thereof, so that it is possible to assemble the polishing head 10 without any air leakage.

Because the pressure and/or vacuum may be selectively supplied to the membrane 28, the inner tube 30 and the retainer ring 22, and because the positive pressure and the level of vacuum are measured at each part to which they are supplied, it is possible to test the polishing head 10 for air leakage when it is completely assembled, or at various points of assembly.

Another advantage of the present invention is that it is possible to determine the pressure applied to each section of a wafer by the polishing head during the polishing process. Therefore, it is possible to apply uniform pressure to the entire wafer, thereby uniformly polishing the wafer.

Figure 6:
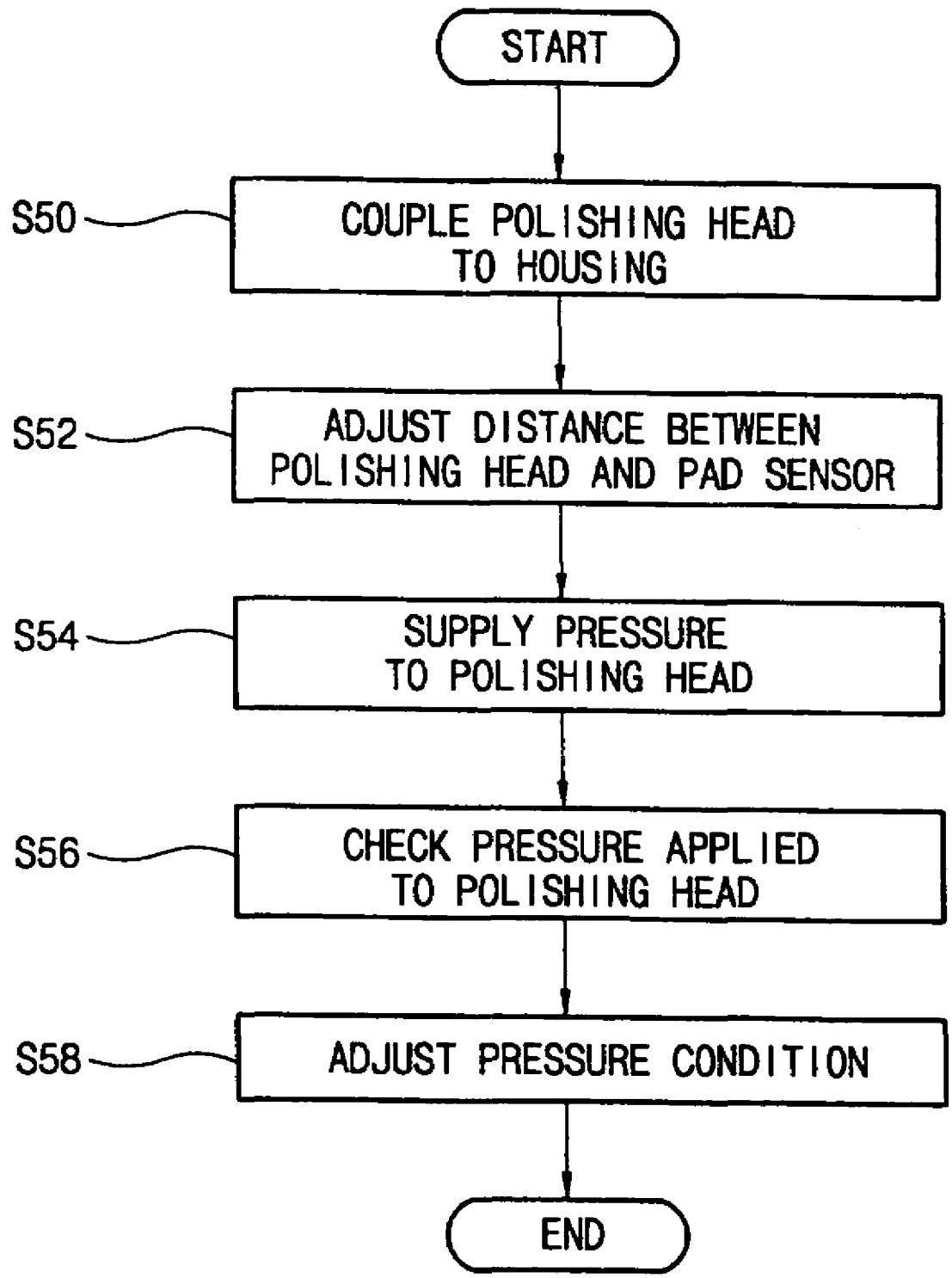
FIG. 6 depicts a flow chart illustrating a step of determining a pressure applied to a wafer by the polishing head.

FIG. 6 shows a flow chart illustrating steps for determining the pressure applied to a wafer by the polishing head.

The tubes 16a, 16b and 16c respectively communicated with the membrane 28, the inner tube 30 and the retainer ring 22 of the assembled polishing head 10 are respectively coupled with the coupling lines 40a, 40b and 40c of the housing 42 in such a manner that the polishing head 10 is supported by the housing 42 (step S50).

Then, the polishing head 10 is spaced apart by a predetermined distance from the seat sensor 84, i.e., a pad sensor, positioned opposite to the bottom of the polishing head 10 by moving the housing 42 up and down through the driving section 47. At this time, the distance between the polishing head 10 and the seat sensor 84 is identical to the distance between the polishing head 10 and the polishing pad during the polishing process (step S52).

The positive pressure applied to each of the tubes 16a, 16b and 16c of the polishing head 10 is identical to the positive pressure supplied when the polishing process is carried out (step S54). Particularly, the positive pressure is supplied from the main pressure regulator 52 via the first connection line 56 and the pressure lines 56a, 56b and 56c, and the pressure is adjusted to a predetermined pressure by means of the first valves 58a, 58b and 58c connected to the pressure lines 56a, 56b and 56c and is transferred to each of the tubes 16a, 16b and 16c.

When the positive pressure is supplied to the tubes 16a, 16b and 16c communicated with the membrane 28, the inner tube 30 and the retainer ring 22 of the polishing head 10, the bottom of the membrane 28 is expanded. In addition, the pressure is applied to the retainer ring 22 and the inner tube 30 so that they make contact with the pad sensor 84. At this time, by detecting the pressure uniformity at each pad of the pad sensor 84, it is possible to inspect the polishing uniformity when the wafer is polished (step S56). Then, the pressure conditions are re-adjusted so as to achieve optimum polishing uniformity (step S58).

Therefore, according to the method for inspecting the polishing head according to the present invention, it is possible to assemble the polishing head without the existence of air leakage, i.e., no loss of positive pressure or level of vacuum, in the tubes of the polishing head. In addition, when the assembled polishing head is used, it is possible to ensure uniform polishing of the wafer by measuring and regulating the pressure applied to the wafer.

While the present invention has been described in detail with reference to the preferred embodiment thereof, it should be understood to those skilled in the art that various changes, substitutions and alterations may be made thereto without departing from the spirit and scope of the invention as set forth in the appended claims.

What is claimed is:

1. A method for assembling a polishing head while inspecting for air leakage in the polishing head, comprising:
    i) assembling an inner tube to a housing and a base;
    ii) supplying a first pressure through a first pressure line to a first tube connected to the inner tube and inspecting for air leakage by determining if there is any variation in the first pressure in the first tube connected to the inner tube;
    iii) assembling a membrane to the base once the inner tube is assembled;
    iv) supplying a second pressure through a second pressure line to a second tube connected to the membrane and inspecting for air leakage by determining if there is any variation in the second pressure in the second tube connected to the membrane;
    v) supplying a first level of vacuum through a first vacuum line to the second tube connected to the membrane and inspecting for air leakage by determining if there is any variation in the level of vacuum in the second tube connected to the membrane;
    vi) assembling a retainer ring to the base once the membrane is assembled, thereby completing an assembling of the polishing head;
    vii) supplying a third pressure through a third pressure line to a third tube connected to the retainer ring and inspecting for air leakage by determining if there is any variation in the third pressure in the third tube connected to the retainer ring; and
    viii) supplying a second level of vacuum through a second vacuum line to the third tube connected to the retainer ring and inspecting for air leakage by determining if there is any variation in the second level of vacuum in the third tube connected to the retainer ring.

2. The method as claimed in claim 1, wherein when air leakage occurs in ii), the assembled inner tube is disassembled and i) to viii) are sequentially repeated.

3. The method as claimed in claim 1, wherein when air leakage occurs in iv) or v), the assembled membrane is disassembled and iii) to viii) are sequentially repeated.

4. The method as claimed in claim 1, wherein when air leakage occurs in vii) or viii), the assembled retainer ring is disassembled and vi) to viii) are sequentially repeated.

5. The method as claimed in claim 1, wherein, in ii), iv) and vii), inspecting for air leakage is carried out by:
    a) supplying a predetermined pressure through a predetermined pressure line into a predetermined tube of the polishing head to be inspected while tubes that are not subject to inspection are closed;
    b) closing the predetermined pressure line, through which the predetermined pressure is supplied to the predetermined tube, once the pressure in the predetermined tube reaches the predetermined pressure;
    c) determining if there is any variation in the pressure in the predetermined tube after a predetermined period of time after closing the predetermined pressure line; and
    d) determining whether air leakage occurs by measuring any pressure variation in the predetermined tube and comparing the pressure variation with the predetermined pressure.

6. The method as claimed in claim 5 further comprising venting pressure from the predetermined tubes after inspecting for air leakage in ii), iv) and vii).

7. The method as claimed in claim 1, wherein, in v) and viii), inspecting for air leakage is carried out by:
    a) supplying a predetermined level of vacuum through a predetermined vacuum line to a predetermined tube of the polishing head to be inspected while tubes that are not subject to inspection are closed;
    b) closing the predetermined vacuum line through which the predetermined level of vacuum is supplied to the predetermined tube, when a level of vacuum in the predetermined tube reaches the predetermined level of vacuum;
    c) determining if there is any variation in the level of vacuum in the predetermined tube after a predetermined period of time after closing the predetermined vacuum line; and d) determining whether or not air leakage occurs by measuring any variation in the level of vacuum in the predetermined tube and comparing the variation in the level of vacuum with the predetermined level of vacuum.

8. The method as claimed in claim 1, further comprising ascertaining uniformity of polishing by applying a pressure to each of the tubes of the polishing head after the polishing head is assembled.

9. The method as claimed in claim 8, wherein ascertaining the uniformity of polishing comprises:
   a) adjusting a first distance between the assembled polishing head and a pad sensor positioned opposite to a bottom of the polishing head to be identical with a second distance between the polishing head and a polishing pad in a course of a polishing process;
   b) applying a pressure identical to the pressure applied during the polishing process to each of the tubes of the polishing head; and
   c) detecting the pressure applied to each part of the pad sensor when the bottom of the polishing head makes contact with the pad sensor by the pressure applied to the polishing head.

* * * * *